(12) United States Patent
Drossel et al.

(10) Patent No.: US 10,480,488 B2
(45) Date of Patent: Nov. 19, 2019

(54) WIND TURBINE WITH A SPEED REGULATOR AND A GENERATOR REGULATOR

(71) Applicant: Nordex Energy GmbH, Hamburg (DE)

(72) Inventors: Detlef Drossel, Norderstedt (DE); Florian Bode, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 430 days.

(21) Appl. No.: 15/294,262

(22) Filed: Oct. 14, 2016

(65) Prior Publication Data

US 2017/0107973 A1  Apr. 20, 2017

(30) Foreign Application Priority Data

Oct. 16, 2015 (EP) ..................................... 15190145

(51) Int. Cl.
*F03D 7/04* (2006.01)
*F03D 7/02* (2006.01)
(Continued)

(52) U.S. Cl.
CPC ............... *F03D 7/042* (2013.01); *F03D 1/06* (2013.01); *F03D 7/0224* (2013.01);
(Continued)

(58) Field of Classification Search
CPC combination set(s) only.
See application file for complete search history.

(56) References Cited

U.S. PATENT DOCUMENTS 7,345,373 B2 *  3/2008  Delmerico ............ F03D 7/0272
290/44
7,714,458 B2  5/2010  Harms et al.
(Continued)

FOREIGN PATENT DOCUMENTS

DE  10 2014 000 784 A1  7/2015
EP       1 946 436 B1  7/2008
WO      2015/078478 A1  6/2015

OTHER PUBLICATIONS

Peng, G., "Nonlinear Feed Forward Pitch Controller for Wind Turbine Based on Rotor's Aerodynamic Characteristic", Proceedings of the Ninth Inernational Conference on Machine Learning and Cybernetics, Jul. 11-14, 2010, pp. 879 to 883, Qingdao, China, IEEE.

*Primary Examiner* — Ninh H. Nguyen
*Assistant Examiner* — Maxime M Adjagbe
(74) *Attorney, Agent, or Firm* — Walter Ottesen, P.A.

(57) ABSTRACT

A wind turbine having a rotor, which has at least one rotor blade adjustable about its longitudinal axis via a pitch control, and a generator, driven by the rotor, having a speed regulator, which takes a control difference in the rotational speed and generates a control variable for the pitch control, and a generator regulator, which takes a power conductance and determines a rotational speed setpoint and a power setpoint, wherein a pilot control is provided that uses an inverse controlled system to determine a control variable for the pitch control, the inverse controlled system determining a power torque (MP) from the rotational speed setpoint and the power setpoint and also an acceleration torque (MB) from the change in the rotational speed setpoint over time and outputting the control variable for the pitch control as an output variable that provides pilot control for the output variable from the speed regulator.

5 Claims, 5 Drawing Sheets

Setpoint and pilot control with inverse system

(51) Int. Cl.
    *F03D 1/06*   (2006.01)
    *F03D 9/25*   (2016.01)
(52) U.S. Cl.
    CPC ........... *F03D 7/0276* (2013.01); *F03D 7/043* (2013.01); *F03D 9/25* (2016.05); *F03D 7/045* (2013.01); *F05B 2270/101* (2013.01); *F05B 2270/309* (2013.01); *Y02E 10/721* (2013.01); *Y02E 10/723* (2013.01)

(56) References Cited

U.S. PATENT DOCUMENTS

| | | |
|---|---|---|
| 8,310,074 B2 | 11/2012 | Larsen et al. |
| RE44,921 E | 6/2014 | Harms et al. |
| 9,217,416 B2 | 12/2015 | Spruce et al. |
| 2003/0151259 A1 | 8/2003 | Feddersen et al. |
| 2013/0148393 A1 | 6/2013 | Larsen |

\* cited by examiner

WIND TURBINE WITH A SPEED REGULATOR AND A GENERATOR REGULATOR

CROSS REFERENCE TO RELATED APPLICATION

This application claims priority of European patent application no. 15190145.1, filed Oct. 16, 2015, the entire content of which is incorporated herein by reference.

FIELD OF THE INVENTION

The present invention relates to a wind turbine having a speed regulator, which takes a control difference in the rotational speed and generates a control variable for a pitch control, and a generator regulator, which actuates the generator, on the basis of a rotational speed and a power setpoint. In the case of the generator actuation, the actuation of the generator by the converter is also regarded as generator control, depending on the configuration of the generator and the converter.

BACKGROUND OF THE INVENTION

EP 1 946 436 B1 discloses a current transformer in which a rectifier and an inverter have a DC link provided between them, the voltage level of which is regulated in accordance with a power requirement and a voltage requirement signal.

U.S. Pat. No. 8,310,074 has disclosed a method and an apparatus for power generation in a wind turbine in which a fault variable feedforward control is provided for damping current oscillations during switching processes.

United States patent application publication 2013/0148393 A1 discloses a method for actuating a power converter in which for a dip in the mains voltage (low voltage ride through LVRT) or a breakdown in the mains voltage (zero voltage ride through ZVRT), there is provision for a feedforward control voltage signal to be actuated for the purpose of determining a voltage setpoint.

WO 2015/078478 A1 discloses a wind turbine that has a feedforward control for the blade pitch angle on the basis of a rate of change of an external reference. The feedforward control is used to prevent power dips in the event of a rapid increase in the supplied power.

In the case of known wind turbines and wind farms, a prescribed change in the power limitation, for example by the wind farm control, or startup of a wind turbine always results in situations in which the power does not increase sufficiently rapidly. Further, rotational speed and power experience overshoot and undershoot, which means that individual wind turbines are exposed to increased loading.

SUMMARY OF THE INVENTION

It is an object of the invention to provide a wind turbine that can rapidly carry out a demanded power increase without great mechanical loading.

The object can, for example, be achieved by a wind turbine having a rotor having at least one rotor blade defining a longitudinal axis; a pitch control; the at least one rotor blade being adjustable about its longitudinal axis via the pitch control; a generator configured to be driven by the rotor; a speed regulator configured to generate a control variable for controlling the pitch of the rotor blade from a control difference in the rpm; a generator control configured to determine a rotational speed setpoint and a power setpoint from a power reference value; a feedforward control for determining the control variable for the pitch control via a feedforward controller; the feedforward controller being configured to determine a power torque ($M_P$) from the rotational speed setpoint and the power setpoint and to determine an acceleration torque ($M_B$) from the time dependent change of the rotational speed setpoint; and, the feedforward controller being further configured to output the control variable for the pitch control as an output variable which is added to a pitch speed and applied to an integrator, wherein the output signal of the integrator is the pitch angle to be set on the wind turbine.

The wind turbine has a rotor, which has at least one rotor blade adjustable about its longitudinal axis by means of a pitch control and has a generator driven by the rotor. For operation of the wind turbine, a speed regulator is provided that takes a control difference in the rotational speed and generates a control variable for the pitch control. Further, a generator regulator is provided that actuates the generator, on the basis of the rotational speed and a power setpoint. The generator can be actuated by means of a converter, for example. The speed regulator and the generator regulator are not necessarily in the form of separate parts or assemblies, but rather may also be a part or a component of a regulator. According to the invention, a pilot control or feedforward controller is provided to which a power reference is applied as an input variable, and which outputs a control variable for the pitch control as an output variable, the output control variable for the pitch control providing feedforward control for the output variable from a speed regulator. The pilot control or feedforward control is provided by means of an inverse control system that determines a power torque from the rotational speed setpoint and the power setpoint and also an acceleration torque from the change in the rotational speed setpoint over time. The effect of the feedforward control for the output variable from the speed regulator is that a control variable for the pitch control is controlled on the basis of a power reference, and the speed regulator takes no action in the implementation of the power reference.

In one preferred embodiment, the pilot control takes the power reference and determines a power setpoint and/or a rotational speed setpoint. When determining the setpoints for the power reference, it is possible to resort to installation-specific ramps, for example, by means of which an abruptly changing conductance is converted into a slowly and/or steadily changing setpoint.

In one preferred embodiment, the pilot control is configured such that the power drawn by the rotor is sufficient at least for the power setpoint and to accelerate the drive train. The advantage of pilot control of a control variable for the pitch control is that the speed regulator needs to take only little action or none at all, which means that an overshoot in rotational speed and power can be avoided, as can severe mechanical loadings on the wind turbine.

In one preferred embodiment, the control variable for the pitch control is an adjustment speed for the blade pitch angle. The adjustment speed integrated over time results in the angle value of the blade pitch angle. The control variable for the pitch control may also be an adjustment angle that is in the form of an angular increment or is in the form of an absolute angle value.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
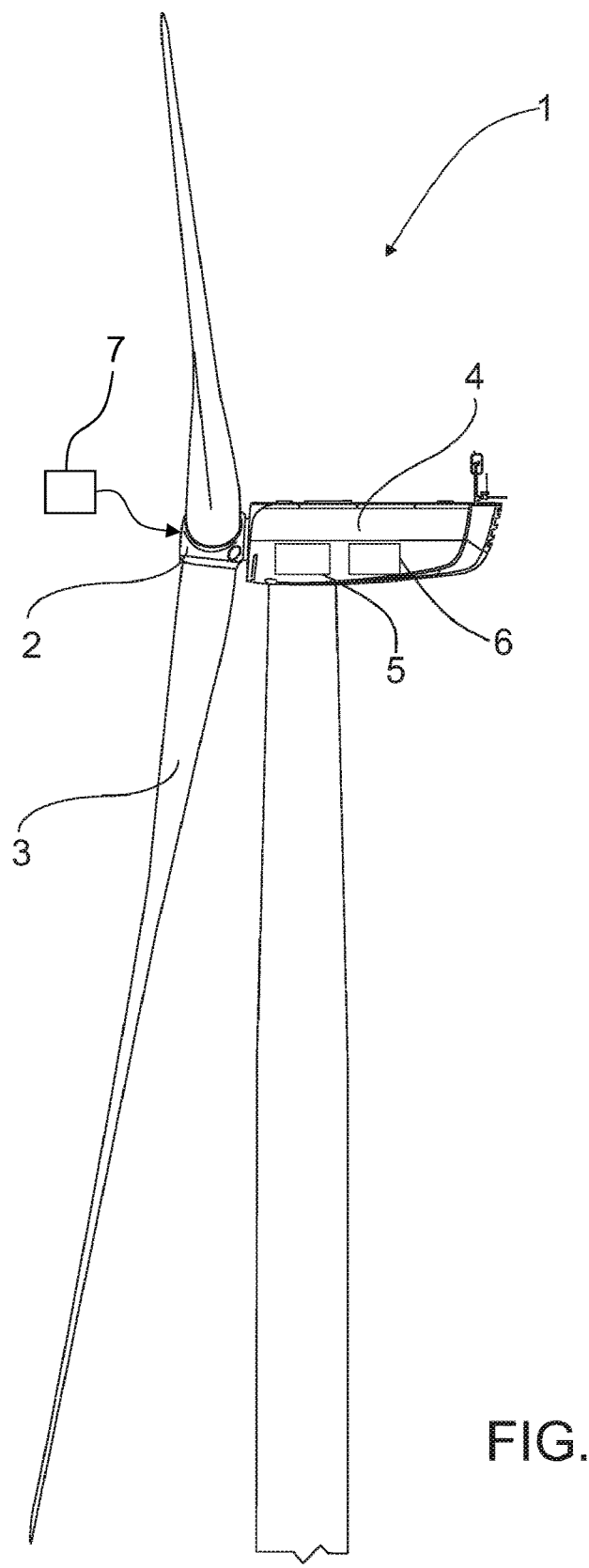
FIG. 1 shows an example of a wind turbine.

FIG. 1 shows an example of wind turbine 1 having a rotor 2 and a rotor blade 3 attached to the rotor 2. The wind turbine 1 further includes a nacelle 4. A drive train 5 and a generator 6 are disposed in the nacelle 4 of the wind turbine 1. A pitch control 7 can be used to adjust the blade pitch of the rotor blade 3.

Figure 2:
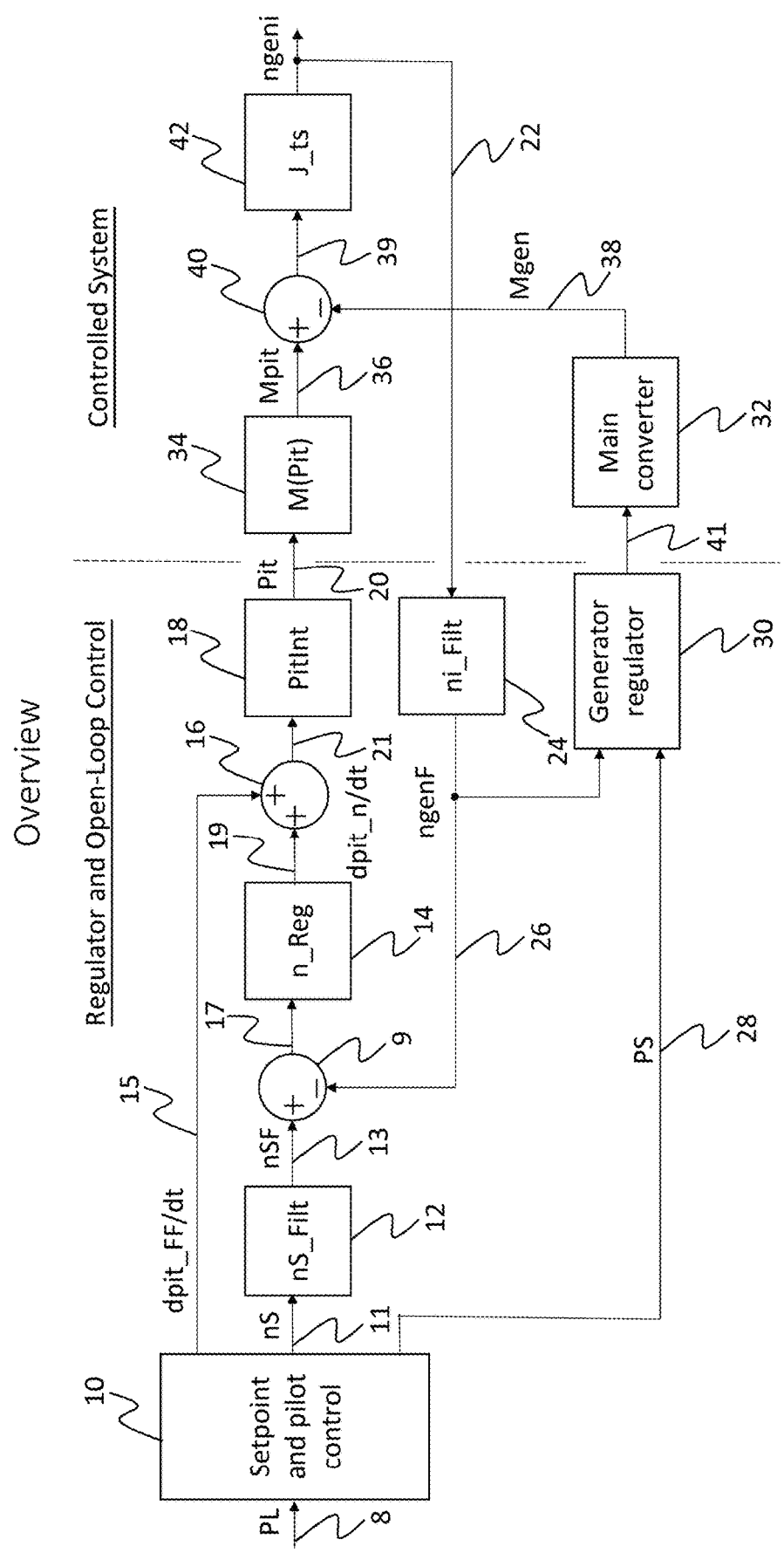
FIG. 2 shows an overview of regulator, open-loop control and controlled system.

FIG. 2 shows an overview with regulator and open-loop control. A power reference PL 8, which may be a value prescribed by a network operator, is the input variable on a setpoint and pilot control block 10. Appropriate ramps, which prescribe a maximum power change for the wind turbine, for example, can be used to determine a power setpoint PS 28 from the power reference PL 8, both variables representing the maximum setpoint power for the wind turbine. A setpoint rotational speed nS 11 is likewise produced by the setpoint and pilot control block 10. In addition, the setpoint and pilot control block 10 produces a control variable for the pitch control dpit_FF/dt 15. This is the change in the blade pitch angle over time, this prescribing not a setpoint but rather the value for the pilot control. A filter nS_Filt 12 is used to filter the setpoint rotational speed nS 11, this compensating for phase shifts arising from rotational speed filtering, from a pitch drive and from further delays in the controlled system. The filtered setpoint rotational speed nSF 13 is combined with a filtered generator speed ngenF 26 at a subtractor 9 and applied as a control difference 17 to a speed regulator n_Reg 14. The speed regulator n_Reg 14 converts the control difference into a pitch speed dpit_n/dt 19. The speed regulator compensates for disturbances, such as a fluctuating wind speed, for example, by prescribing a pitch speed. The pitch speed dpit_n/dt 19 ascertained in this manner and the control variable for the pitch control dpit_FF/dt 15 are added in an adder 16 and the sum 21 is applied to an integrator PitInt 18. The output signal from the integrator PitInt 18 is the pitch angle Pit 20 that is to be set on the wind turbine. An actual value for the generator speed ngeni 22 is determined on the wind turbine and filtered in a filter ni_Filt 24 in order to obtain a filtered actual generator speed ngenF 26. The filtered generator speed ngenF 26 is applied together with the power setpoint PS 28 to a generator regulator 30, which uses the output signal 41 to actuate the main converter 32 of the wind turbine.

In order to be able to use closed-looped control engineering to ascertain a control variable for the pitch control dpit_FF/dt 15 as a control signal for the pilot control, it is useful to envision the correlations in the controlled system. In the block M(Pit) 34, the applied setpoint for the pitch angle Pit 20 is converted for the blade pitch angle, which results, via the actual pitch angle, in the associated rotor torque Mpit 36. The rotor torque Mpit 36 drives the drive train of the wind turbine, and a generator torque Mgen 38 resulting from actuation of the main converter 32 slows it down. Therefore, the difference for a resultant torque 39 is formed in a subtractor 40. The resultant torque 39 acts via the moment of inertia of the drive train J_ts 42 in order to produce the actual value for the generator speed ngeni 22. In this situation, the known correlation n=60*M/(2*Pi*J_ts) applies.

In the case of the overview with regulator and open-loop control that is shown in FIG. 2, a change in the pitch speed on the basis of the power reference PL 8 is described. This involves a pilot control in which the aim is a balance between the power drawn via the rotor and the generator power plus power for accelerating the drive train. Since the power characteristic prescribes the desired correlation between power and rotational speed, the pitch speed can be controlled by means of the pilot control such that the rotor draws as much power as is necessary for acceleration and generator power. With a correctly set pilot control in the setpoint and pilot control block 10 and under constant operating conditions, the speed regulator n_Reg 14 takes next to no action and severe mechanical loadings, overshoots and other mechanically onus circumstances for the wind turbine are avoided.

Figure 3:
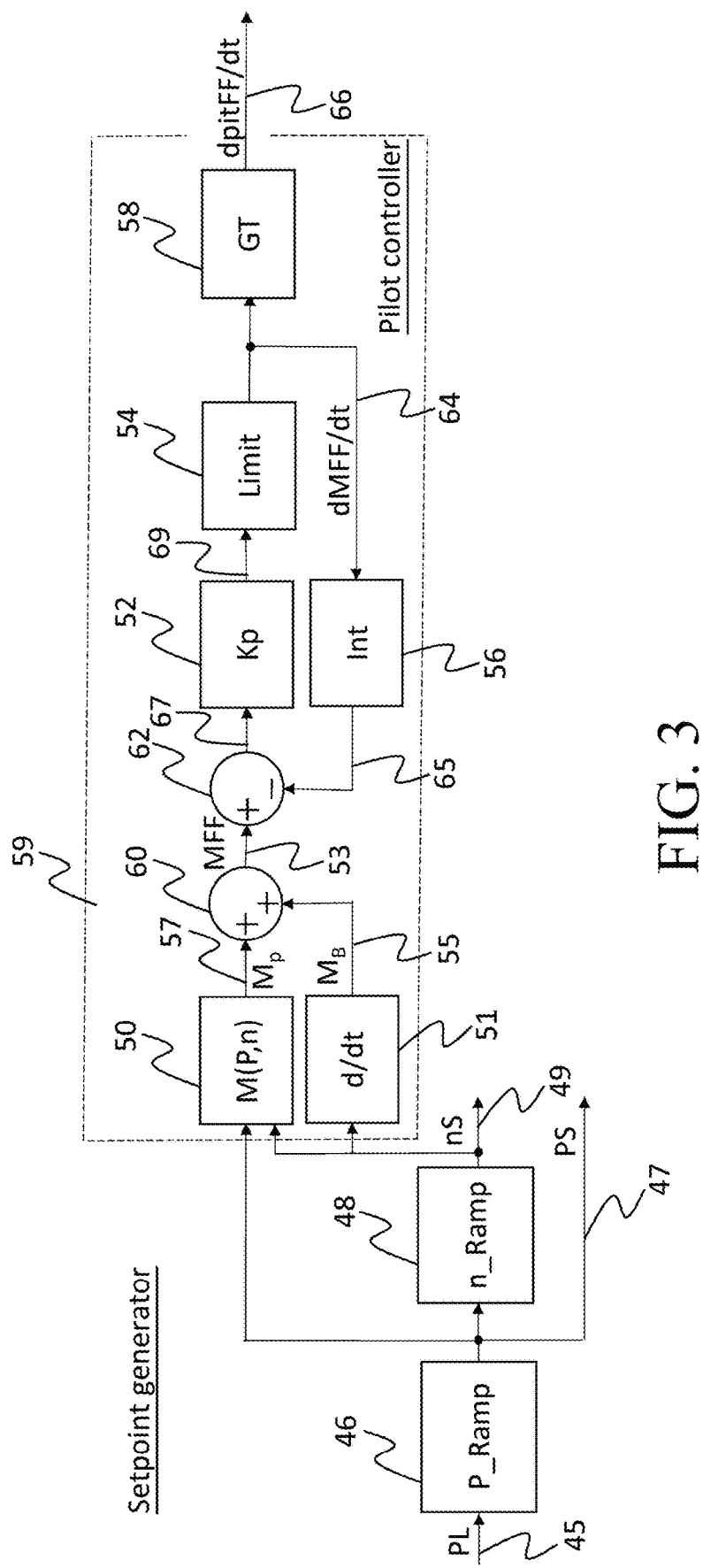
FIG. 3 shows the determination of power setpoint, rotational speed setpoint and control variable for the pitch control, the pilot control being provided by means of an inverse system.

FIG. 3 shows an embodiment according to the invention in which the pilot control is provided by means of an inverse controlled system. FIG. 3 therefore shows an embodiment of the setpoint formation and pilot control according to block 10 from FIG. 2. As FIG. 3 shows, the applied power reference PL 45 is first of all converted into a power setpoint PS 47 using a ramp function P-Ramp 46. A further downstream rotational speed ramp n_Ramp 48 is used to convert the power reference PL 45 into a setpoint rotational speed nS 49. The setpoint rotational speed nS 49 is applied together with the power setpoint PS 47 to a pilot control block 59. The pilot control 59 is used to compute a pitch speed that matches the actual power to the setpoint power and matches the actual rotational speed to the setpoint rotational speed. In a block M(P, n) 50, the pilot control 59 takes the power setpoint PS 47 and the setpoint rotational speed nS 49 and ascertains the power-based torque $M_P$ 57. The derivative d/dt 51 of the setpoint rotational speed nS 49 is used to take into consideration the change in the rotational speed in the wind turbine and to compute the acceleration-based torque $M_B$ 55. The sum of torque from power $M_P$ 57 and torque from acceleration $M_B$ 55 is processed further in the pilot control 59 as a total torque subject to pilot control MFF 53. The total torque subject to pilot control MFF 53 is derived via a gain block Kp 52 and a limiting block Limit 54, the derived value dMFF/dt 64 being routed back to a subtractor 62 as signal 65 via an integrator block 56. The pilot control 59 uses the derivation performed to take into consideration the behavior of the wind turbine too. The derivation function, consisting of the blocks 52, 54, 56 and 62, has the advantage that limitations for the pitch speed from the block Limit 54 can be taken into consideration and the integral from dMFF/dt 64 corresponds to the value MFF 53. The change over time in the total torque subject to pilot control is converted by means of a nonlinear gain tuning function GT 58 into the time derivative of the pitch angle subject to pilot control dpitFF/dt 66. In this case, dpitFF/dt 66 is computed as the time derivative of the blade pitch angle subject to pilot control from the setpoint torque change dMFF/dt 64.

In blocks 52, 54, 56 and 62, the torque is derived to obtain "dMFF/dt". The gain Kp 52 stipulates the dynamic transient response of the feedback loop. In the block Limit 54, the level of the output value is limited. This is necessary because the pitch drive is also subject to a speed limit. The fedback integrator Int 56 again integrates a torque that is subtracted from the torque MFF 53. This configuration limits the magnitude of the derivative of the torque and hence of the pitch angle. At the same time, there is the assurance that the integral of dMFF/dt ultimately corresponds to "MFF", despite limiting, or the total pilot control pitch angle is displaced. Simple derivation and subsequent limiting would stop the pilot control pitch angle too early.

Figure 5:
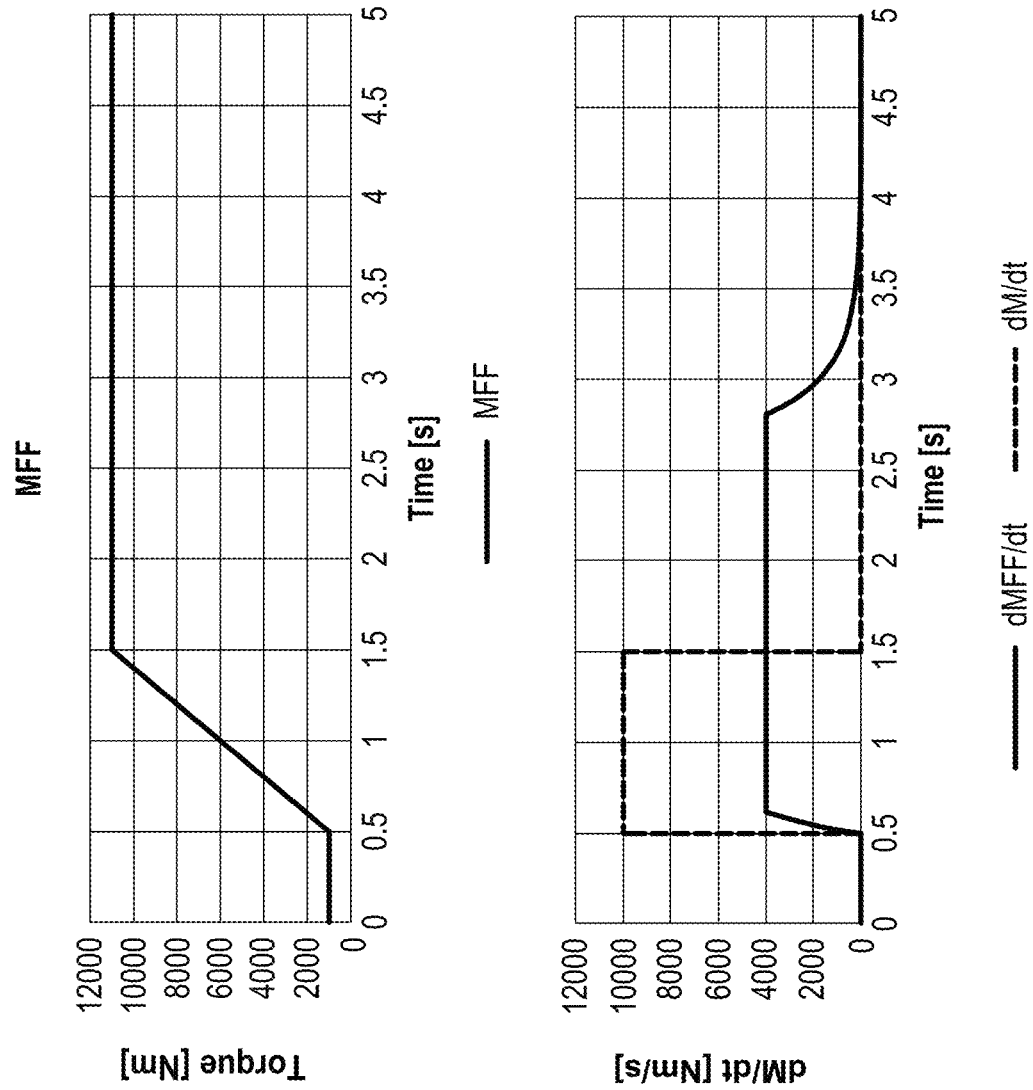
FIG. 5 shows a time profile for the torque and the temporal trend in the derivative of the torque based on time.

This can be seen in FIG. 5: Kp=4, Limit=4000, increase MFF from 1000 Nm to 11000 Nm. The variable dMFF/dt is limited to 4000 Nm. Beneath its curve, there is the area of 10000 Nm. By contrast, dM/dt is not limited. The pitch drive would not be able to follow rapidly enough. If dM/dt were limited to 4000 Nm, the area beneath the curve would be too small and the pitch angle would not be displaced to a sufficient extent.

Figure 4:
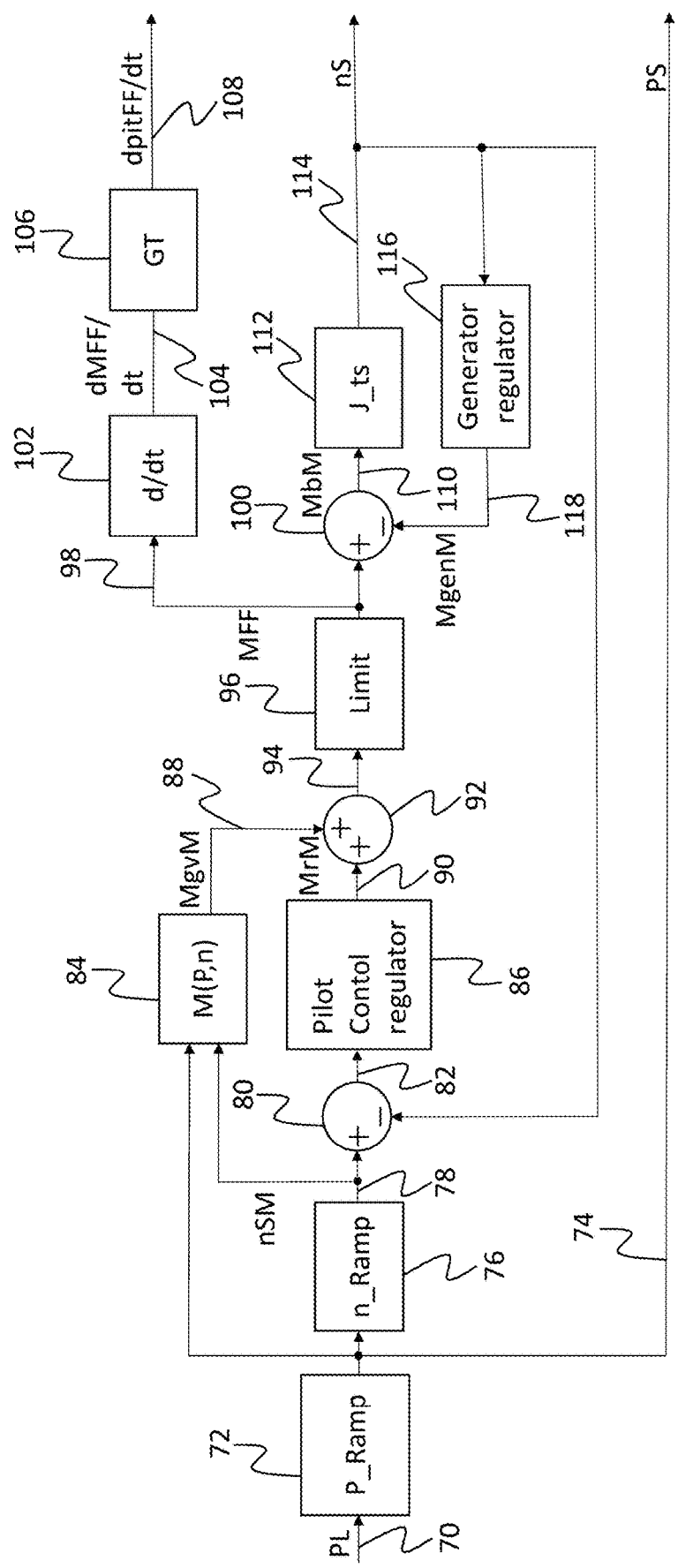
FIG. 4 shows an exemplary pilot control with a system model.

FIG. 4 shows an example of a system model in order to produce the rate of change subject to pilot control. Again, a ramp function P_Ramp 72 is used to ascertain a power setpoint PS 74 from the power reference PL 70. The rotational speed ramp n_Ramp 76 is used to ascertain a setpoint rotational speed model value nSM 78. A pilot control regulator 86 for the model is used to determine a regulator torque MrM 90. The modeled generator torque MgvM 88 is determined using the power setpoint PS 74 and the setpoint rotational speed model value nSM 78 in block M(P, n) 84. The sum of the modeled generator torque MgvM 88 and the regulator torque MrM 90 is formed in an adder 92 and is applied to a limiter Limit 96 as signal 94. The limiter Limit 96 takes into consideration the actual configuration of the wind turbine and produces the total torque subject to pilot control MFF 98. The total torque MFF 98 is derived in d/dt 102 and converted into the speed of pitch angle change subject to pilot control dpitFF/dt 108 using a gain tuning function GT 106. The rotational speed nS 114 suitable in this regard is determined using the moment of inertia J_ts 112 of the drive train, this involving—in order to obtain just one modeled acceleration torque—a modeled generator regulator 116 being used to ascertain a modeled generator torque MgenM 118. This then results in the rotational speed setpoint nS 114 suitable for the speed of pitch angle change dpit FF/dt 108.

This configuration uses a model of the installation (of the controlled system). It includes the moment of inertia J_ts 112 of the drive train, the closed-loop control of the generator torque in the generator regulator 116 and all the relevant limits. It takes into account, for example, the limit for the pitch speed "dpitFF/dt" or a limit for the torque change "dMFF/dt" produced by the rotor, a limit for the rate of change of the drive train speed "dns/dt" and a limit for the power increase or the generator torque increase "dMgen_M/dt". If one of these values is limited, then the output signal MFF 98 from the limiter Limit 96 is limited. If the signal 94 at the input of the limit Limit 96 is too large, then the output signal MFF 98 is limited such that the power and the rotational speed increase in optimum fashion within their limits. The torque of the rotor MFF 98 is derived in d/dt 102 and converted into the pilot control pitch speed dpitFF/dt 108 using a gain tuning function in block GT 106. Since the rotational speed nS 114 in the model is based on the same torque MFF 98 as the pilot control pitch speed dpitFF/dt 108, it is used as a setpoint rotational speed for the speed regulator of the real installation.

There are several possible solutions for producing the signal 94 at the input of the limiter Limit 96. In the present case, a regulator is proposed, which takes the pilot control setpoint rotational speed nSM 78 and the model rotational speed nS 114 and computes a rotational speed error 82. This is used in the pilot control regulator 86 to compute the torque MrM 90. Many closed-loop control algorithms are possible. Additionally, the setpoint power PS 74 and the pilot control setpoint rotational speed nSM 78 are used to form the pilot control generator torque MgvM 88. The sum of the two torques, which is formed at the adder 92, is routed as signal 94 to the input of the limiter Limit 96.

It is understood that the foregoing description is that of the preferred embodiments of the invention and that various changes and modifications may be made thereto without departing from the spirit and scope of the invention as defined in the appended claims.

What is claimed is:

1. A wind turbine comprising:
   a rotor having at least one rotor blade defining a longitudinal axis;
   a pitch control;
   said at least one rotor blade being adjustable about said longitudinal axis via said pitch control;
   a generator configured to be driven by said rotor;
   a speed regulator configured to generate a control variable (dpitFF/dt) for controlling the pitch of said rotor blade from a control difference in rpm;
   a ramp function (P_Ramp) and a further downstream rotational speed ramp configured to determine a rotational speed setpoint (nS) and a power setpoint (PS) from a power reference value (PL);
   a feedforward controller for determining said control variable (dpitFF/dt) for said pitch control;
   said feedforward controller being configured to determine a power torque ($M_P$) from said rotational speed setpoint (nS) and said power setpoint (PS) and to determine an acceleration torque ($M_B$) from a time dependent change of said rotational speed setpoint (nS); and,
   said feedforward controller being further configured to output said control variable (dpitFF/dt) for said pitch control as an output variable which is added to a pitch speed (dpit_n/dt) and applied to an integrator (PitInt) configured to output an output signal, wherein said output signal of said integrator (PitInt) is a pitch angle to be set on the wind turbine.

2. The wind turbine of claim 1 further comprising:
   a drive train; and,
   said feedforward controller being configured such that power drawn by said rotor is sufficient at least to provide said power setpoint (PS) and an acceleration of said drive train.

3. The wind turbine of claim 1, wherein said control variable (dpitFF/dt) for said pitch control corresponds to an adjustment speed for a blade pitch angle.

4. The wind turbine of claim 3, wherein said control variable (dpitFF/dt) for said pitch control corresponds to an adjustment angle for said blade pitch angle.

5. The wind turbine of claim 1, wherein a time dependent change rate is determined for a sum of said power torque ($M_P$) and said acceleration torque ($M_B$) which is applied to an amplification to determine the control variable (dpitFF/dt) to be outputted for said pitch control.

* * * * *